(12) United States Patent
Nagahori et al.

(10) Patent No.: US 6,275,541 B1
(45) Date of Patent: Aug. 14, 2001

(54) DIGITAL RECEIVER CIRCUIT

(75) Inventors: Takeshi Nagahori; Shunichi Kanemitsu, both of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/096,007

(22) Filed: Jun. 11, 1998

(30) Foreign Application Priority Data

Jun. 18, 1997 (JP) .................................................. 9-160721

(51) Int. Cl.[7] ............................ H04L 25/10; H04B 10/06
(52) U.S. Cl. ................................................ 375/318; 359/194
(58) Field of Search .................................... 375/316, 318, 375/317, 319, 340; 359/189, 194

(56) References Cited

U.S. PATENT DOCUMENTS

| | | | |
|---|---|---|---|
| 4,257,125 | * 3/1981 | Theal et al. | 359/194 |
| 4,545,076 | * 10/1985 | Biard et al. | 359/194 |
| 5,430,765 | * 7/1995 | Nagahori | 375/318 |
| 5,539,779 | * 7/1996 | Nagahori | 375/317 |
| 5,777,507 | * 7/1998 | Kaminishi et al. | 327/514 |
| 6,018,407 | * 1/2000 | Hatakeyama | 359/289 |

FOREIGN PATENT DOCUMENTS 62-257204   11/1987   (JP) .

OTHER PUBLICATIONS

Monolithic AGC Loop for a 160 Mb/s Transimpedance Amplifier (Sep. 1996) IEEE *Journal of Solid–State Circuits* *31*(9):1331–1335.

* cited by examiner

Primary Examiner—Tesfaldet Bocure
(74) Attorney, Agent, or Firm—Scully, Scott Murphy & Presser

(57) ABSTRACT

A digital receiver circuit is easily integrated into a single chip. A differential output amplifier circuit is used for performing a binarizing decision by a quantizer for a differential output. A peak detection circuit, an average value detection circuit, an operational amplifier and a transistor are provided for controlling an input impedance and an offset of the differential output amplifier circuit depending upon a differential output. Thus, a capacitor for alternating current coupling as required conventionally, becomes unnecessary to facilitate integration into a single chip with minimum number of parts by full DC coupling.

12 Claims, 6 Drawing Sheets

DIGITAL RECEIVER CIRCUIT

BACKGROUND OF THE INVENTION

1. Field of the Invention

The present invention relates generally to a digital receiver circuit. More particularly to a photo receiver circuit in a form of IC for an optical data link.

2. Description of the Related Art

In a transmitter and receiver of an optical data link, speeding-up, down-sizing, lowering of cost, power saving, providing wider reception dynamic range corresponding to a transmission line of plastic optical fiber being inexpensive and having large loss, have been demanded.

A construction of the conventional wide reception dynamic range photo receiver circuit is illustrated in FIG. 5. The shown conventional circuit is constructed with a photodiode 1, a pre-amplifier portion 15 and a post amplifier portion 16. Then, the pre-amplifier portion 15 and the post amplifier portion 16 are connected by way of an alternating current coupling employing a capacitor 23.

The pre-amplifier portion 15 has been disclosed in Japanese Unexamined Patent Publication (Kokai) No.Showa 62-257204. The pre-amplifier portion 15 is constructed with an inverting type transimpedance amplifier 11, an npn type transistor 3 having an emitter connected to an input end of the transimpedance amplifier 11 and a collector connected to a positive power source, an npn type transistor 4 having a collector connected to an input end of the transimpedance amplifier 11 and an emitter connected to a negative power source, a constant voltage source 19 and an operational amplifier 20 performing non-inverting amplification and level shifting for an output of the transimpedance amplifier 11, a peak detection circuit 17 detecting and holding a peak value of the output of the operational amplifier 20 and outputting to a base of the transistor 3, a constant voltage source 21 and an operational amplifier 22 performing inverting amplification and level shifting for an output of the transimpedance amplifier 11, and a peak detection circuit 18 detecting and holding a peak value of the output of the operational amplifier 22 and outputting to a base of the transistor 4.

The post amplifier portion 16 is constructed with a differential output limiting amplifier 24 and a quantizer 14 outputting one of a logical "1" and a logical "0" depending upon polarity of a differential voltage of a positive-phase output and a negative-phase output of the limiting amplifier 24.

Next, discussion will be given for an operation of the pre-amplifier portion 15 of the conventional photo receiver circuit with reference to FIG. 6. FIG. 6 shows a relationship between an amplitude of a photo current pulse flowing into the photodiode 1 and an output voltage at a point B. A bias is applied so that both transistors 3 and 4 are turned OFF (Tr3 off, Tr4 off) when an amplitude of the input current is small, for lowering of noise. Therefore, operation of the pre-amplifier portion 15 becomes linear operation of the inverting type transimpedance amplifier 11. According to increasing of the amplitude of the input current, a voltage BM at a point B corresponding to a mark portion drops and a voltage BS at a point B corresponding to a space portion becomes constant.

When the amplitude of the input current increases, in an offset control loop constructed with a transistor 4, a peak detector 18, a constant voltage source 21 and an operational amplifier 22, the voltage corresponding to the mark portion is detected by the peak detection circuit 18. By this, the transistor 4 turns ON (tr4 on) to maintain the voltage at the point B corresponding to the mark portion. Thus, according to increasing of the amplitude of the input current, the voltage of the point B corresponding to the space is elevated.

When the amplitude of the input current is further increased, in addition to the operation of the foregoing offset control loop, in an input impedance control loop constituted of a transistor 3, a peak detector 17 a constant voltage source 19 and an operational amplifier 20, a voltage corresponding to the space portion is detected by the peak detection circuit 17. By this, the transistor 3 is turned ON (Tr3 on) to lower an input impedance. Accordingly, an alternating current component of an input current pulse flows to the transistor 3 and a direct current component flows to the transistor 4 so that quite limited amount is input to the transimpedance amplifier 11. Thus, an automatic gain control is performed for maintaining the voltages BM and BS at the point B respectively corresponding to the mark portion and the space portion constant even if the amplitude of the input current is increased. By this, comparing with the transimpedance amplifier 11, a dynamic range of the input can be significantly increased.

In the above-mentioned conventional photo receiver circuit encounters the problems to cause difficulty in integration of the pre-amplifier portion and the pose amplifier portion into a single chip and in reduction of number of parts which are inherent for down-sizing, lowering of power consumption and for lowering of price.

Namely, in order to achieve integration into a single chip, it becomes necessary for establishing DC coupling for all of the circuits. However, in the conventional receiver circuit, since the DC level of the output of the pre-amplifier 15 is variable depending upon the amplitude of the input current, an alternating coupling using an external capacitor 23 externally applied to the IC becomes necessary between the pre-amplifier portion and the post amplifier. Therefore, number of parts and power consumption can be increased.

SUMMARY OF THE INVENTION

The present invention has been worked out for solving the problems in the prior art set forth above. Therefore, it is an object of the present invention to provide a digital receiver circuit which can establish DC coupling between all circuits with minimum number of parts and can easily integrated into a single chip.

According to the first aspect of the present invention, a digital receiver circuit including a photoelectric converter element covering an input light into an electric signal, a differential output amplifier circuit receiving an output of the photoelectric converter element and a control circuit controlling an offset and an input impedance of the differential output amplifier circuit, for binarizing decision for the differential output, comprises:

first and second peak detection circuits respectively detecting peak values of the differential output;

a peak difference detection circuit for detecting a difference between two peak values detected by the first and second peak detection circuits;

an offset control circuit controlling offset of the differential output amplification circuit depending upon a result of detection of the peak difference detection circuit;

an average value detection circuit deriving an average value of the two peak values detected by the first and second peak detection circuit;

a comparing circuit comparing derived average value with a predetermined reference voltage; and an input impedance control circuit for controlling an input impedance of the differential output amplification circuit depending upon a result of comparison of the comparing circuit.

According to the second aspect of the present invention, a digital receiver circuit including a photoelectric converter element covering an input light into an electric signal, a transimpedance amplifier amplifying an output of the photoelectric converter element, a differential output amplifier circuit outputting a result of comparison of an amplified output and a predetermined reference voltage as a differential signal, for binarizing identification for the differential output, comprises:

first and second peak detection circuits respectively detecting peak values of the differential output;

a peak difference detection circuit for detecting a difference between two peak values detected by the first and second peak detection circuits;

an offset control circuit controlling offset of the differential output amplification circuit depending upon a result of detection of the peak difference detection circuit;

a third peak detection circuit detecting a peak value of an output of the transimpedance amplifier; and an input impedance control circuit for controlling an input impedance of the differential output amplification circuit depending upon a peak value detected by the third peak detection circuit.

The input impedance control circuit may include a transistor connected in parallel with the photoelectric converter element, for controlling a bias of the transistor detecting upon a result of comparison by the comparing circuit. Also, the offset control circuit may include a transistor connected in parallel with the photoelectric converter element, for controlling a bias of the transistor detecting upon a result of detection by the peak difference detection circuit.

The differential output amplifier circuit may be a differential input type and the peak difference detection circuit may be a differential output type, the offset control circuit controls an input voltage of a positive phase and a negative phase of the differential output amplifier circuit by respective of a positive phase output and a negative phase output of the peak difference detection circuit, and the input impedance control circuit may control an input impedance between a positive phase input terminal and a negative phase input terminal of the differential output amplifier circuit depending upon the result of comparison of the comparing circuit.

The offset control circuit may include a first transistor having a source and a drain (or collector and emitter) connected between a positive phase input terminal of the differential output amplifier circuit and a negative power source voltage and a second transistor having a source and a drain (or collector and emitter) connected between a negative phase input terminal of the differential output amplifier circuit and the negative power source voltage, gates (or bases) of the first and second transistors may be controlled by differential output of the peak difference detection circuit. The input impedance control circuit may have a third transistor having a source and a drain connected between a positive phase input terminal and a negative phase input terminal of the differential output amplifier circuit and a gate controlled depending upon a result of comparison of the comparing circuit.

In short, the circuit according to the present invention employs the differential output amplifier circuit to control the input impedance and the offset by the differential output. Thus, the capacitor for alternating current coupling as required conventionally, becomes unnecessary. And, integration into a single chip with minimum number of parts by full DC coupling can be facilitated.

BRIEF DESCRIPTION OF THE DRAWINGS

The present invention will be understood more fully from the detailed description given herebelow and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to avoid unnecessarily obscure the present invention.

Figure 1:
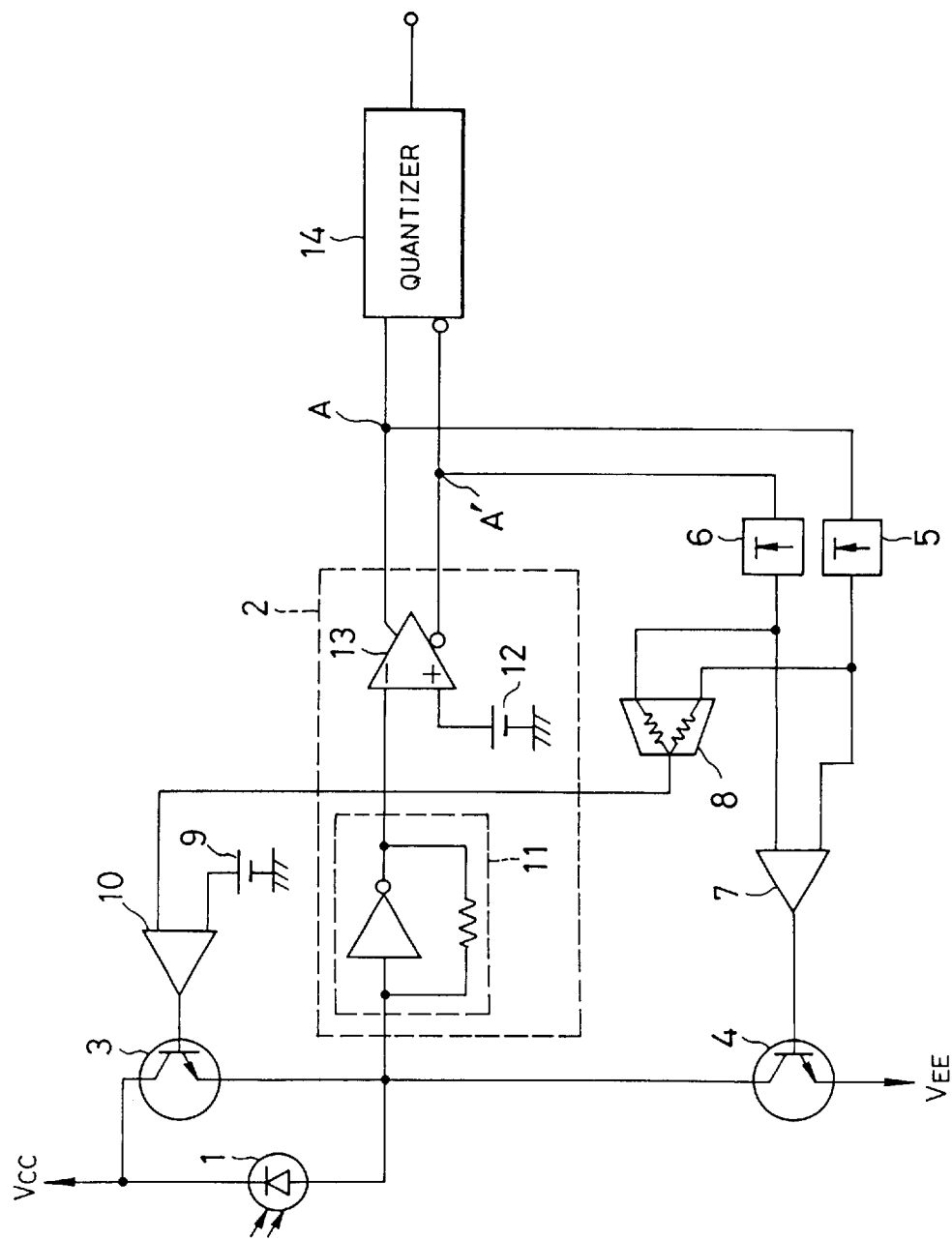
FIG. 1 is a block diagram showing a construction of the first embodiment of a digital receiver circuit according to the present invention.

Referring now to FIG. 1, there is illustrated a block diagram showing the first embodiment of a digital photo receiver circuit according to the present invention.

A current pulse generated through a photoelectric conversion by means of a photodiode 1 is amplified after current/voltage conversion by a differential output amplifier 2 and output therefrom. The output is introduced into an identifying circuit 14 and one of logical "1" and logical "0" is output depending upon positive and negative of a differential voltage of a positive phase output and a negative phase output of the differential output amplifier 2.

The differential output amplifier 2 is constructed with an inverting type transimpedance amplifier 11, a constant voltage source generating a voltage substantially equal to an output upon no signal input of the transimpedance amplifier 11, and a differential amplifier 13 receiving an output of the transimpedance amplifier 11 and an output of a constant voltage source 12. The differential amplifier 13 is in a limiting condition at an output amplitude of 2.0V.

To an input end of the transimpedance amplifier 11, an npn type transistor 3 having an emitter connected to the input end of the transimpedance amplifier 11 and a collector connected to a positive power source, and an npn transistor 4 having a collector connected to the input end of the transimpedance amplifier 11 and an emitter connected to a negative power source, are connected.

The positive phase output and the negative phase output of the differential output amplifier 2 are respectively branched and input to the peak detection circuits 5 and 6. Then, peak values of the positive phase output pulse and the negative phase output pulse are detected and held, respectively. A differential voltage of the peak values of the positive phase output pulse and the negative phase output pulse held by the differential output amplifier 2 is amplified by the operational amplifier 7, level shifted and is applied to the base of the transistor 4.

On the other hand, by an average value detection circuit 8 consisted of a voltage divider resistor circuit, an average value of the held positive phase output pulse and the held negative phase output pulse of the differential amplifier 2 is obtained. The average value is compared with the output of the constant voltage source 9 by the operational amplifier 10, and thereafter is amplified, level shifted and is applied to the base of the transistor 3.

Figure 2:
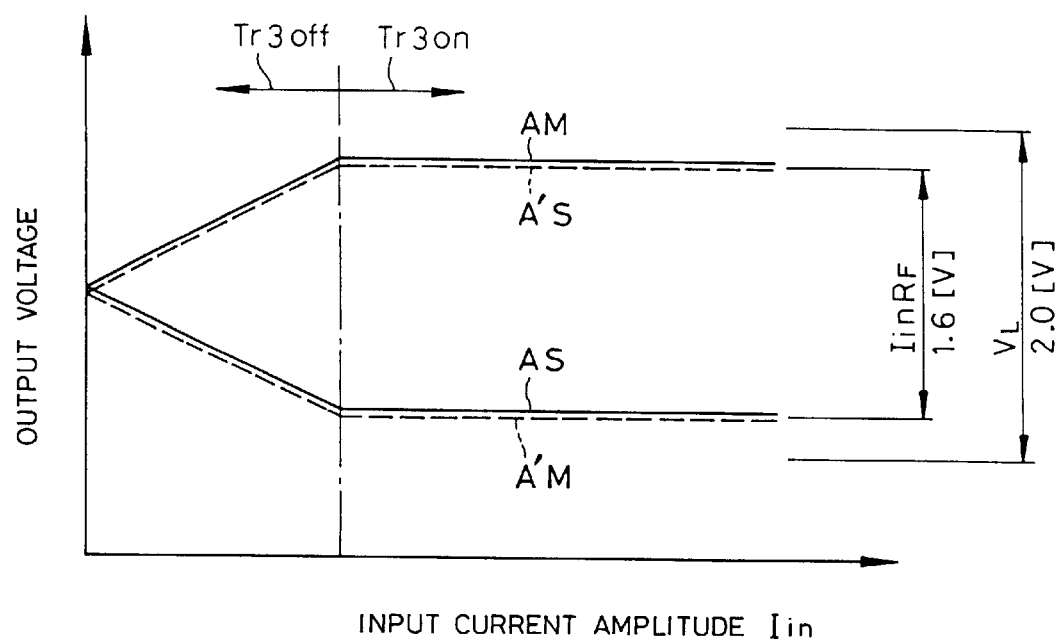
FIG. 2 is a waveform chart showing an operation of the digital receiver circuit of FIG. 1.

Next, discussion for an operation of the first embodiment of the digital receiver circuit will be given with reference to FIG. 2.

At first, when an amplitude of the output of the differential output amplifier 2 is less than or equal to 1.6V, a base-emitter voltage of the transistor 3 is biased to the less than or equal to about 0.5V to turn the transistor 3 OFF state. Therefore, in such case, it is required to consider only operation of the offset control loop constituted of the transistor 4, the operational amplifier 7 and the peak detectors 5 and 6.

Since the amplifier 2 is a differential output type, amplitudes of the positive phase output and the negative phase output are substantially equal. Also, the peak value of the positive phase output and the peak value of the negative phase output are substantially equal to each other by the operation of the offset control loop. Therefore, a center value of the positive phase output and a center value of the negative phase output that input to the identifying circuit 14 without using a coupling capacitor for alternating current coupling, become substantially equal to each other. This means that an identification level control is taken place. Namely, as illustrated by a voltage AM at a point A corresponding to a mark portion, a voltage AS at the point A corresponding to a space portion, a voltage A'M of a point A' corresponding to the mark portion, and a voltage A'S at the point A' corresponding to the space portion in FIG. 2, assuming that a gain of the transimpedance of the differential output amplifier 2 is RF, an input current amplitude to the differential output amplifier 2 is Iin, a differential output voltage in the differential output amplifier 2, namely, the differential voltage between the positive phase output voltage and the negative phase output voltage, becomes +IinRF at a mark, and –IinRF at a space.

On the other hand, degradation of an S/N ratio associating with increasing of shot noise due to collector current of the transistor 3 is concerned. However, since the output voltage of the constant voltage source 12 is set substantially equal to an output upon no signal input of the transimpedance amplifier 11, the collector current of the transistor 4 becomes substantially Iin/2 irrespective of an amplitude of the input current. Accordingly, upon inputting of a fine amplitude signal where S/N ratio of the circuit can be a problem, a shot noise due to the same current becomes smaller comparison with a circuit noise of the transimpedance amplifier 11. Accordingly, degradation of the S/N ratio dose not become a problem.

Next, when the amplitude of the input current is increased and thus the amplitude of the output of the differential output amplifier 2 exceeds 1.6V, the output voltage of the average value detection circuit 8 becomes close to the output voltage of the constant voltage source 9. Then, a base-emitter voltage of the transistor 3 exceeds 0.5V to gradually turn the transistor 3 ON. Namely, the input impedance of the transistor 3 as viewed from the input end of the differential output amplifier 2 is lowered.

Thus, the alternating current component of the input current pulse flows through the transistor 3 and the direct current component of the input current pulse flows through the transistor 4 so that only a little part of the input current pulse is input to the transimpedance amplifier 11. When the amplitude of the input current is increased, the base-emitter voltage of the transistor 3 is increased to further lower the input impedance. As a result, further greater fraction of the alternating component of the input current pulse flows through the transistor 3. In this manner, the automatic gain control for maintaining the amplitude of the output of the differential output amplifier 2 at substantially 1.6V can be performed. As a result, in comparison with the transimpedance amplifier 11, a dynamic range of the input has been significantly increased.

Even in the shown condition, the amplifier 2 is in the differential output type and uses the amplitude of 1,6V lower than the limiting amplitude 2.0V. Therefore, the amplitudes of the positive phase output and the negative phase output becomes substantially equal to each other. Accordingly the center value of the positive phase output and the center value of the negative phase output to be input to the identifying circuit 14 becomes substantially equal to each other without using the coupling capacitor for alternating current coupling. Thus, the identification level control is performed in conjunction with the all DC coupling and automatic gain control. Accordingly, integration of the circuit into a single chip of IC can be easily realized to permit down-sizing, lowering of price and lowering of power consumption.

In down-sizing and lowering of price of the photo receiver, reduction of number of parts to be externally applied to the IC chip is also quite important. In the prior art, it is not possible to receive four capacitors in total consisted of two capacitors for pole formation and also serving as a holding capacities for the peak detection circuits 17 and 18, one capacitor as the coupling capacitor 23 and one capacitor for a time constant circuit for cancelling offset of the limiting amplifier 24. In contrast to this, the shown embodiment employs a loop design, in which a secondary pole of the automatic gain control loop and offset control loop by a charge and discharge time constant of the peak detection circuits 5 and 6. Therefore, a capacity of the holding capacitor is set to be 200 pF. Thus, the capacitors may be housed in an IC chip in a practically useful chip size. A primary pole is formed by parallel connection of capacitors of 0.1 (F to the base portion of the transistors 3 and 4. Thus, number of capacitors which cannot be housed in the IC chip can be reduced to be two. Therefore, it becomes possible to mount those capacitors in a small size clear mold of the wide dynamic range receiver to realize significant down-sizing and lowering of price.

On the other hand, with taking the peak detection circuits 5 and 6 as primary poles, and with employing ones having small leakage as applied the fine current circuit using BiCMOS discussed on IEEE "Journal of Solid-State Circuit" vol. 31, No. 9, page 1331, external capacitor other than a power source bypass becomes completely unnecessary.

Figure 3:
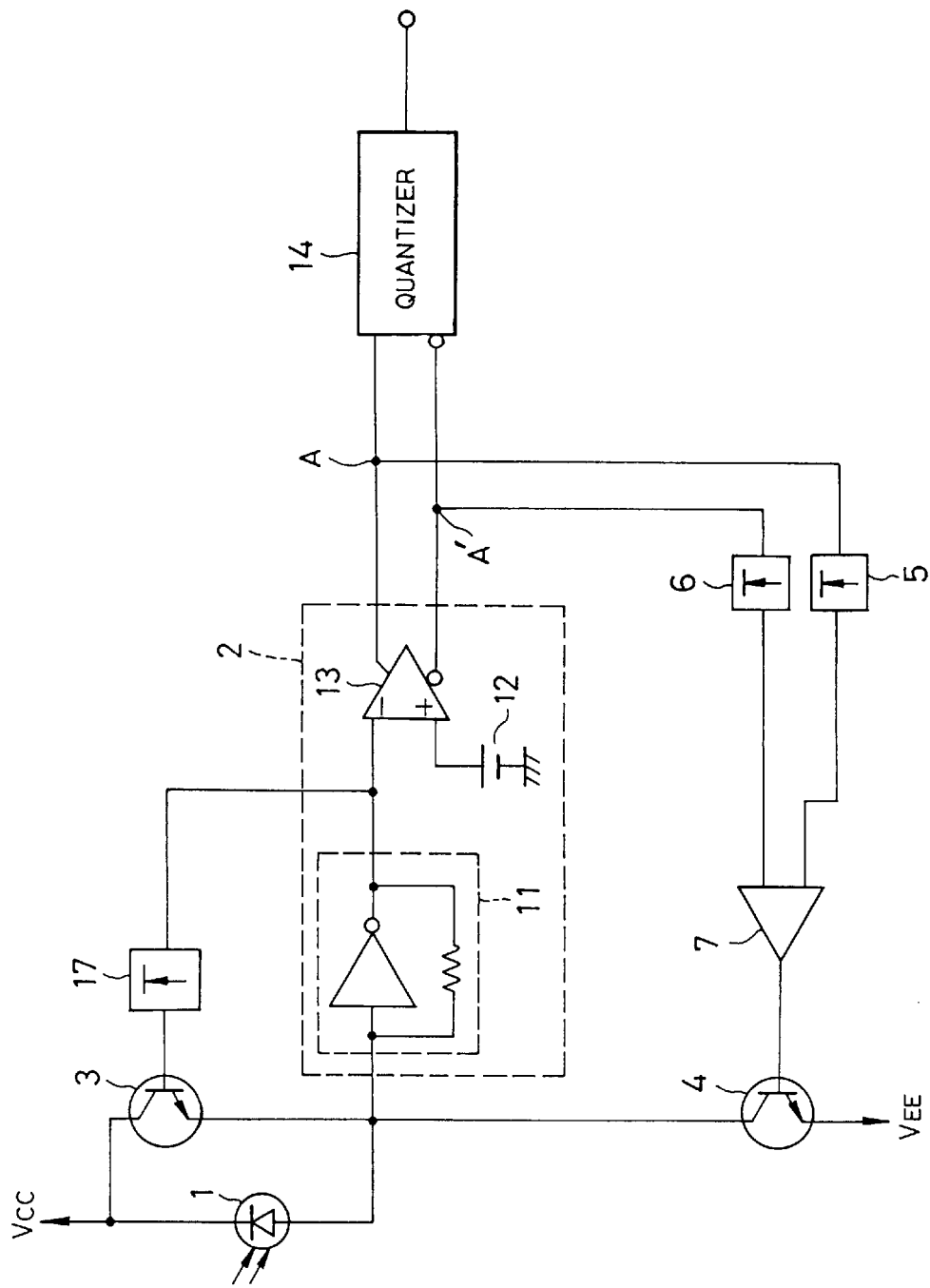
FIG. 3 is a block diagram showing a construction of the second embodiment of the digital receiver circuit according to the present invention.

FIG. 3 is a block diagram showing the second embodiment of a digital photo receiver circuit according to the present invention. In the following disclosure, like parts to those in FIG. 1 will be identified by like reference numerals and detailed description thereof will be neglected for keeping the disclosure simple enough to facilitate clear understanding of the present invention. In the shown embodiment, the photodiode 1, the differential output amplifier 2, the quantizer 14, the differential output amplifier 2, the inverting type transimpedance amplifier 11, the constant voltage source 12 and the differential amplifier 13 are the same as those employed in the foregoing first embodiment. The input ends of the transimpedance amplifier 11 is connected to the npn type transistors 3 and 4. Also, the positive phase output and the negative phase output of the differential output amplifier 2 are respectively branched and input to the peak detection circuits 5 and 6, respectively. Thus, the peak values of the positive phase output pulse and the negative phase output pulse can be detected, respectively. The differential voltage of the peak values of the held positive phase output pulse and the held negative phase output pulse of the differential output amplifier 2, is amplified, level shifted and applied to the base of the transistor 4.

The inverting type transimpedance amplifier 11 amplifies at a gain that one per a gain of the differential amplifier 13 in the differential output amplifier 2. The peak values of the output of the inverting type transimpedance amplifier 11, namely, level shifted signal can be detected by the peak detection circuit 17. The output of the peak detection circuit 17 is level shifted and applied to the base of the transistor 3.

Next, the operation of the second embodiment of the digital photo receiver circuit will be discussed with reference to FIG. 2, again.

The operation in the case where the amplitude of the output of the differential output amplifier 2 is lower than or equal to 1.6V, is the same as that of the first embodiment.

When the amplitude of the input current is increased and the amplitude of the output of the differential output amplifier 2 exceeds 1.6V, the amplitude of the inverting type transimpedance amplifier 11 is proportionally increased. Then, the output voltage of the peak value detection circuit 17 is elevated to exceed. Thus, the base-emitter voltage exceed 0.5V to gradually turn ON the transistor 3. Namely, similarly to the first embodiment, the input impedance of the transistor 3 as viewed from the input end of the differential output amplifier 2 can be lowered.

Even in case of the second embodiment set forth above, a loop design to form the secondary pole of the automatic gain control loop and the offset control loop by the charge and discharge time constant of the peak detection circuits 5 and 6, is employed. Therefore, the capacity of the holding capacitor is set to be 200 pF to be housed in the IC chip of the practically useful chip size. On the other hand, the primary pole is constituted of a capacitor of 0.1 (F for holding of the peak detection circuit 17 and a capacitor of 0.1 (F connected in parallel to the base portion of the transistor 4. Thus, number of capacitors which cannot be housed in the IC chip can be reduced to be two. Therefore, it becomes possible to mount those capacitors in a small size clear mold of the wide dynamic range receiver to realize significant down-sizing and lowering of price. These effects are the same as those achieved by the foregoing first embodiment.

Figure 4:
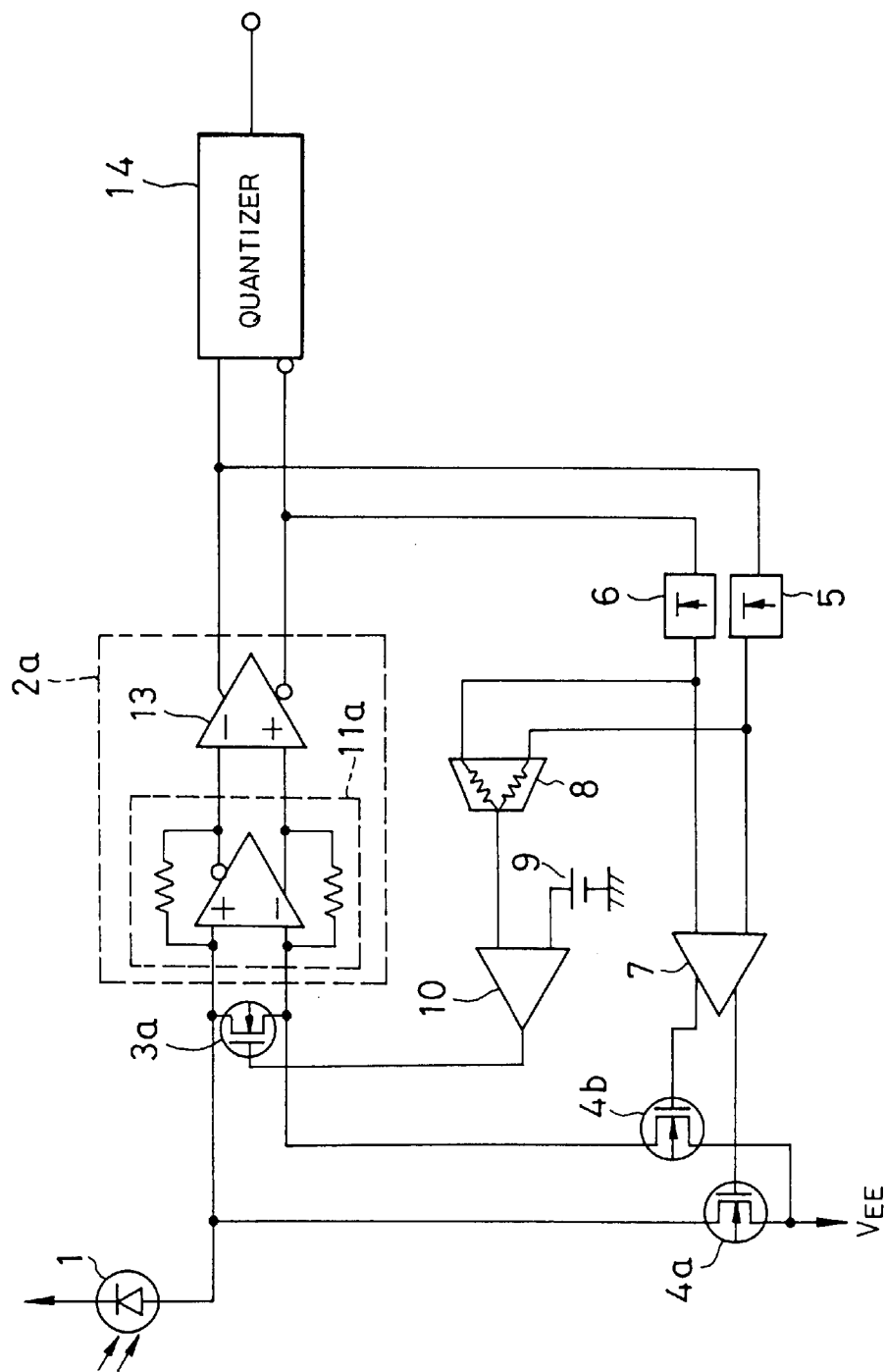
FIG. 4 is a block diagram showing a construction of the third embodiment of the digital receiver circuit according to the present invention.
Figure 5:
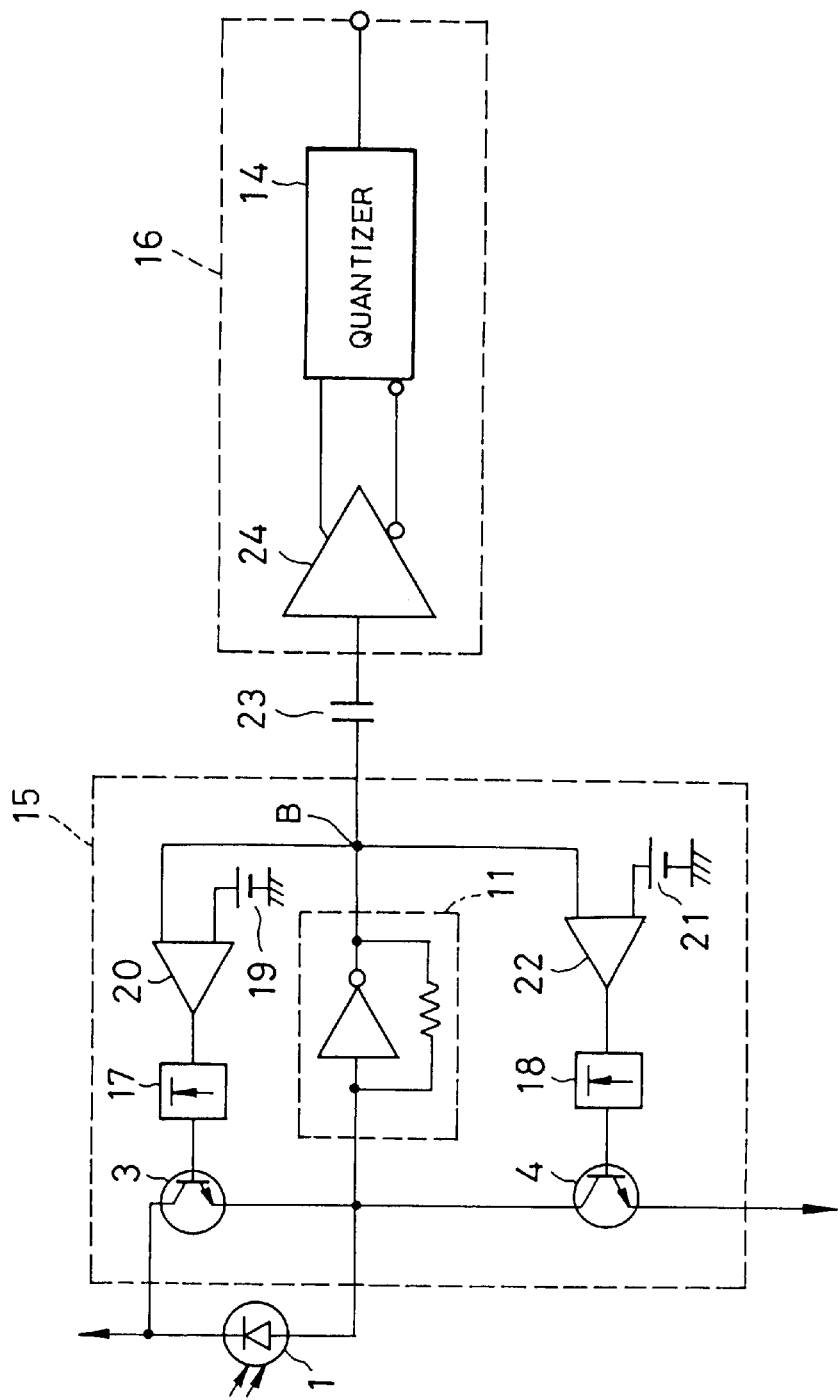
FIG. 5 is a block diagram showing a construction of the conventional digital receiver circuit.
Figure 6:
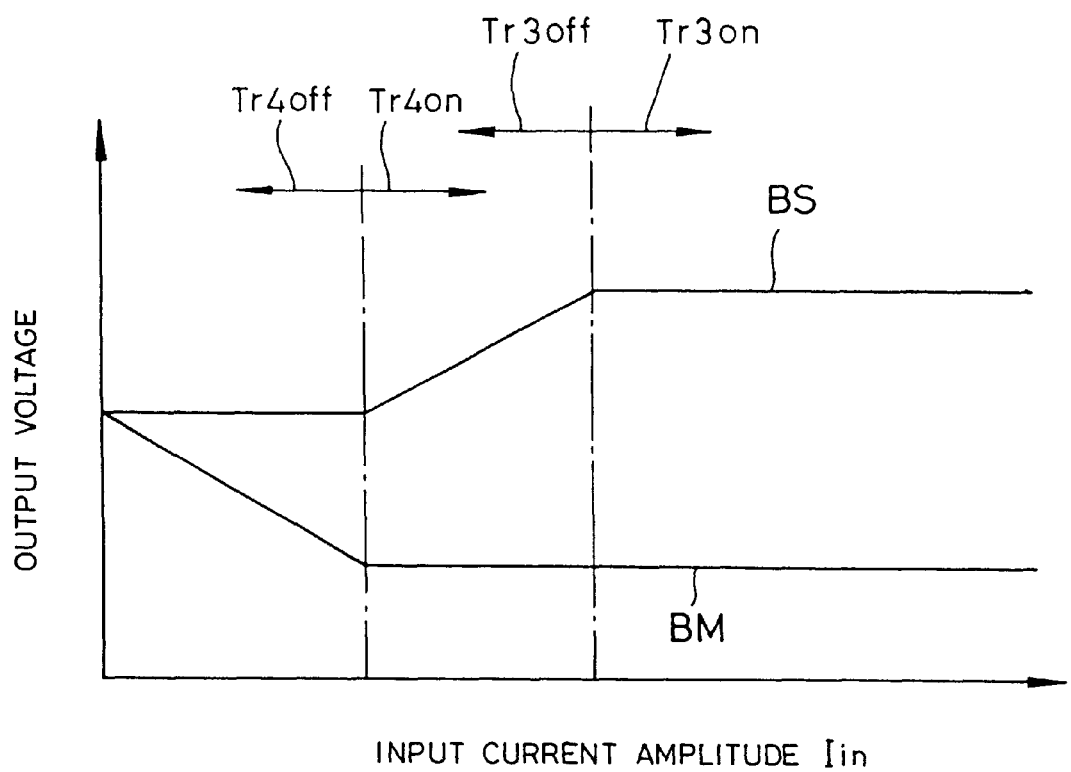
FIG. 6 is a waveform chart showing an operation of the digital receiver circuit of FIG. 5.

FIG. 4 is a block diagram showing the third embodiment of the digital photo receiver circuit according to the present invention. In the third embodiment of FIG. 4, a differential output amplifier 2a is a differential input type and similarly, the transimpedance amplifier 11a is also the differential input type. An input impedance varying circuit includes an N-channel MOSFET 3a having drain and source respectively connected to the positive phase input terminal and the negative phase input terminal of the amplifier 2a. By increasing a gate voltage of the MOSFET 3a, a drain/source resistance can be reduced to vary the input impedance.

On the other hand, the offset varying circuit includes N-channel MOSFETs 4a and 4b connected to the positive phase input terminal and the negative phase input terminal of the amplifier 2a. Drains of both MOSFETs 4a and 4b are connected to the input terminal of the amplifier 2a, and sources thereof are connected to a negative power source VEE. It is also possible to employ bipolar transistors in place of these N-channel MOSFETs 4a and 4b. In such case, the collectors of both transistors are connected to the input terminal of the amplifier 2a, and emitters are connected to the negative power source VEE for controlling bias to the base by the output of the amplifier 7.

As set forth above, with the circuits set forth above, the photo receiver having wide dynamic range can be realized with full DC coupling which facilitates integration into a single IC chip, and with minimum number of parts. Therefore, the circuit of the present invention is quite useful for down-sizing, lowering of power consumption, widening of dynamic range in reception corresponding to the inexpensive transmission line having large loss, such as plastic optical fiber or the like, of the receiver for the optical data link.

As set forth above, the present invention makes the capacitor for alternating current coupling which has been required conventionally, becomes unnecessary by controlling the input impedance and offset using the differential output amplifier circuit, for enabling full DC coupling with the minimum number of parts and with facilitating integration by a single IC chip.

Although the present invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. A digital receiver circuit including a photoelectric converter element for converting an input light into an electric signal, a differential output amplifier circuit receiving an output of said photoelectric converter element, a control circuit controlling an offset and an input impedance of said differential output amplifier circuit, and a quantizer for binarizing an output of said differential output amplifier, said control circuit further comprising:
   first and second peak detection circuits respectively detecting peak values of said differential output;
   a peak difference detection circuit for detecting a difference between two peak values detected by said first and second peak detection circuits;
   an offset control circuit for controlling the offset of said differential output amplification circuit depending upon a result of detection of said peak difference detection circuit;

an average value detection circuit for deriving an average value of said two peak values detected by said first and second peak detection circuits;

a comparator circuit for comparing derived average value with a predetermined reference voltage; and an input impedance control circuit for controlling an input impedance of said differential output amplification circuits depending upon a result of the comparison of said comparing circuit.

2. A digital receiver circuit including a photoelectric converter element for converting an input light into an electric signal, a transimpedance amplifier amplifying an output of said photoelectric converter element, a differential output amplifier circuit outputting a result of a comparison of an amplified output, a predetermined reference voltage as a differential signal, and a quantizer for binarizing the output of said differential output, said control circuit further comprising:

first and second peak detection circuits respectively for detecting peak values of said differential output;

a peak difference detection circuit for detecting a difference between two peak values detected by said first and second peak detection circuits;

an offset control circuit for controlling the offset of said differential output amplifier circuit depending upon a result of detection of said peak difference detection circuit;

a third peak detection circuit for detecting a peak value of an output of said transimpedance amplifier; and an input impedance control circuit for controlling an input impedance of said differential output amplification circuit depending upon a peak value detected by said third peak detection circuit.

3. A digital receiver circuit as set forth in claim 1, wherein said input impedance control circuit includes a transistor connected in parallel with said photoelectric converter element, wherein, a result of a comparison by said comparator is used for controlling a bias of said transistor.

4. A digital receiver circuit as set forth in claim 1, wherein said offset control circuit includes a transistor connected in parallel with said photoelectric converter element, wherein, a result of a detection by said peak difference detection circuit is used for controlling a bias of said transistor.

5. A digital receiver circuit as set forth in claim 2, wherein said input impedance control circuit includes a transistor connected in parallel with said photoelectric converter element, for controlling a bias of said transistor detecting upon a peak value detected by said third peak detection circuit.

6. A digital receiver circuit as set forth in claim 2, wherein said offset control circuit includes a transistor connected in parallel with said photoelectric converter element, wherein, a result of a detection by a peak difference detection circuit is used for controlling a bias of said transistor.

7. A digital receiver circuit as set forth in claim 1, wherein said differential output amplifier circuit is a differential input type and said peak difference detection circuit is a differential output type, said offset control circuit controls an input voltage of a positive phase and a negative phase of said differential output amplifier circuit by respective of a positive phase output and a negative phase output of said peak difference detection circuit, and said input impedance control circuit controls an input impedance between a positive phase input terminal and a negative phase input terminal of said differential output amplifier circuit depending upon the result of comparison of said comparing circuit.

8. A digital receiver circuit as set forth in claim 7, wherein said offset control circuit includes a first transistor having a source and a drain connected between a positive phase input terminal of said differential output amplifier circuit and a negative power source voltage and a second transistor having a source and a drain connected between a negative phase input terminal of said differential output amplifier circuit and said negative power source voltage, and gates of said first and second transistors are controlled by differential output of said peak difference detection circuit.

9. A digital receiver circuit as set forth in claim 7, wherein said offset control circuit includes a first transistor having a collector and an emitter connected between a positive phase input terminal of said differential output amplifier circuit and a negative power source voltage and a second transistor having a collector and an emitter connected between a negative phase input terminal of said differential output amplifier circuit and said negative power source voltage, and bases of said first and second transistors are controlled by differential output of said peak difference detection circuit.

10. A digital receiver circuit as set forth in claim 7, wherein said input impedance control circuit has a third transistor having a source and a drain connected between a positive phase input terminal and a negative phase input terminal of said differential output amplifier circuit and a gate controlled depending upon a result of comparison of said comparator.

11. A digital receiver circuit as set forth in claim 1, wherein said differential output amplifier circuit includes a transimpedance amplifier amplifying an output of said photoelectric converter element and a differential amplifier circuit outputting a result of comparison of an amplified output and a predetermined reference voltage as a differential signal, and said predetermined reference voltage is equal to an output voltage of said differential amplifier circuit at no signal input.

12. A digital receiver circuit as set forth in claim 2, wherein said predetermined reference voltage of said differential output amplifier circuit is equal to an output voltage of said differential amplifier circuit at no signal input.

* * * * *